(12) United States Patent
Gordon et al.

(10) Patent No.: US 11,240,485 B2
(45) Date of Patent: Feb. 1, 2022

(54) METHODS CIRCUITS DEVICES ASSEMBLIES SYSTEMS AND FUNCTIONALLY ASSOCIATED WITH COMPUTER EXECUTABLE CODE FOR IMAGE ACQUISITION WITH DEPTH ESTIMATION

(71) Applicant: MANTISVISION LTD., Petach Tikva (IL)

(72) Inventors: Eyal Gordon, Haifa (IL); Ronen Einat, Shoham (IL)

(73) Assignee: MANTISVISION LTD., Petach Tikva (IL)

( * ) Notice: Subject to any disclaimer, the term of this patent is extended or adjusted under 35 U.S.C. 154(b) by 1 day.

(21) Appl. No.: 16/414,335

(22) Filed: May 16, 2019

(65) Prior Publication Data

US 2019/0273908 A1    Sep. 5, 2019

Related U.S. Application Data

(62) Division of application No. 14/946,820, filed on Nov. 20, 2015, now abandoned.

(Continued)

(51) Int. Cl.
*H04N 13/271* (2018.01)
*H04N 13/254* (2018.01)
(Continued)

(52) U.S. Cl.
CPC ....... *H04N 13/271* (2018.05); *G01B 11/2513* (2013.01); *G06F 3/017* (2013.01);
(Continued)

(58) Field of Classification Search
CPC ......... H04N 13/0271; H04N 13/00222; H04N 13/0253; H04N 2013/0081; G06T 7/521;
(Continued)

(56) References Cited

U.S. PATENT DOCUMENTS 8,090,194 B2    1/2012  Gordon et al.
8,538,166 B2    9/2013  Gordon et al.
(Continued)

FOREIGN PATENT DOCUMENTS

CN    103109158 A    5/2013
CN    104050656 A    9/2014
(Continued)

OTHER PUBLICATIONS

Second Office Action dated Nov. 22, 2019 issued in counterpart Chinese Application No. 201580073758.0, 23 pages.
(Continued)

*Primary Examiner* — Eileen M Adams
(74) *Attorney, Agent, or Firm* — Finnegan, Henderson, Farabow, Garrett & Dunner, LLP

(57) ABSTRACT

Disclosed are methods, circuits, devices, systems and functionally associated computer executable code for image acquisition with depth estimation. According to some embodiments, there may be provided an imaging device including: (a) one or more imaging assemblies with at least one image sensor; (b) at least one structured light projector adapted to project onto a scene a multiresolution structured light pattern, which patterns includes multiresolution symbols or codes; and (3) image processing circuitry, dedicated or programmed onto a processor, adapted to identify multiresolution structured light symbols/codes within an acquired image of the scene.

18 Claims, 7 Drawing Sheets

Related U.S. Application Data

(60) Provisional application No. 62/082,225, filed on Nov. 20, 2014.

(51) Int. Cl.
| | |
|---|---|
| *G06T 7/521* | (2017.01) |
| *G01B 11/25* | (2006.01) |
| *G06F 3/01* | (2006.01) |
| *G06F 3/03* | (2006.01) |
| *H04N 13/128* | (2018.01) |
| *H04N 13/00* | (2018.01) |

(52) U.S. Cl.
CPC ............ *G06F 3/0304* (2013.01); *G06T 7/521* (2017.01); *H04N 13/254* (2018.05); *G06T 2207/20016* (2013.01); *H04N 13/128* (2018.05); *H04N 2013/0081* (2013.01)

(58) Field of Classification Search
CPC ....... G06T 2207/20016; G01B 11/2513; G06F 3/017; G06F 3/0304
See application file for complete search history.

(56) References Cited

U.S. PATENT DOCUMENTS

| | | | |
|---|---|---|---|
| 8,848,201 B1* | 9/2014 | Bruce | G01B 11/24 356/601 |
| 2004/0005092 A1* | 1/2004 | Tomasi | G01B 11/25 382/154 |
| 2004/0105580 A1* | 6/2004 | Hager | G06T 7/596 382/154 |
| 2011/0181704 A1 | 7/2011 | Gordon et al. | |
| 2012/0081360 A1 | 4/2012 | Uehira et al. | |
| 2012/0197461 A1* | 8/2012 | Barrows | G06T 7/223 701/1 |
| 2012/0237112 A1* | 9/2012 | Veeraraghavan | G06T 7/521 382/154 |
| 2013/0120802 A1* | 5/2013 | Shimamura | H04N 1/40068 358/447 |
| 2013/0329018 A1 | 12/2013 | Gordon et al. | |
| 2014/0267701 A1* | 9/2014 | Aviv | G01B 11/2536 348/136 |
| 2015/0254815 A1* | 9/2015 | Lin | G06T 3/40 382/299 |

FOREIGN PATENT DOCUMENTS

| | | |
|---|---|---|
| CN | 107209007 A | 9/2017 |
| WO | WO 2016/079718 A1 | 5/2016 |
| WO | WO 2013/144952 A1 | 11/2016 |

OTHER PUBLICATIONS

International Search Report and Written Opinion issued in PCT/IB2015/059013, dated Mar. 17, 2016.
PCT International Preliminary Report on Patentability issued in PCT/IB2015/059013, dated May 23, 2017.
The First Office Action issued by the State Intellectual Property Office of People's Republic of China in Chinese Patent Application No. 201580073758.0, dated Jan. 2, 2019.

* cited by examiner

METHODS CIRCUITS DEVICES ASSEMBLIES SYSTEMS AND FUNCTIONALLY ASSOCIATED WITH COMPUTER EXECUTABLE CODE FOR IMAGE ACQUISITION WITH DEPTH ESTIMATION

RELATED APPLICATIONS

This application is a divisional application of U.S. application Ser. No. 14/946,820, filed Nov. 20, 2015, which is based on and claims priority to U.S. Provisional Application No. 62/082,225, filed Nov. 20, 2014). Each of the above-referenced applications is incorporated by reference in their entireties.

FIELD OF THE INVENTION

The present invention generally relates to the field of imaging. More specifically, the present invention relates to methods, circuits, devices, assemblies, systems and functionally associated computer executable code for image acquisition with depth estimation.

BACKGROUND

Depth sensing and three dimensional imaging systems are used in a wide array of applications. In some depth sensing systems, a coded structured light pattern is projected onto an object and an image of the object including the pattern is obtained and processed to derive a three dimensional geometry of the object which may be translated into depth information. Such systems generally require significant processing power to derive detailed depth information.

Furthermore, such depth sensing systems have a certain coverage area and range. For example, the ability of a depth sensing system to extract depth is limited by the system's depth of field ("DOF"). The areas outside the system's DOF are usually areas where the image is out of focus or areas where the SNR is too low (e.g., due to signal decay). Another factor which limits the coverage of a depth sensing system can be local interference created by optical characteristics of an object or surfaces within the scene. Such interference can attenuate or modulate the reflected signal such that decoding of the corresponding area in the resulting image fails.

SUMMARY OF INVENTION

The present invention relates to methods, circuits, devices, systems and functionally associated computer executable code for image acquisition with depth estimation. According to some embodiments, there may be provided an imaging device including: (a) one or more imaging assemblies with at least one image sensor; (b) at least one structured light projector adapted to project onto a scene a multiresolution structured light pattern, which patterns may include multiresolution visual symbols or code-words; and (3) image processing circuitry, dedicated or programmed onto a processor, adapted to identify multiresolution structured light symbols/codes within an acquired image of the scene.

The terms "symbol", "visual symbol", "code-word" and/or "code" may be used interchangeably and may denote a portion of a projected visual pattern whose shape and/or other visual characteristics may include, encode or otherwise represent information usable to extract or estimate depth information about points and/or areas of an object onto which the pattern is projected. More specifically, each symbol may include and be characterized by some combination of visually detectable symbol elements, wherein symbol elements may be of different symbol element types. Each symbol element type may represent or encode a portion of information, which encoded information may be absolute or may have a different meaning depending upon its context, for example, where it is located in the pattern and/or which other symbols are in its proximity.

According to some embodiments, a multiresolution structured light pattern may include both "coarse" and "fine" symbols, wherein "coarse" symbols of a structured light pattern according to embodiments may encode, convey or otherwise provide relatively lower depth resolution information than do "fine" symbols of the same patterns. Both coarse and fine symbols according to embodiments may be detectable within an acquired image by image processing circuitry. Coarse symbol may be relatively larger shapes than fine symbols. Being relatively larger than fine symbols, coarse symbols may be more readily, and in some cases more quickly, detectable within an acquired image. Course symbols may be detectable and/or decodable in an acquired image where fine symbols are not detectable or decodable at all, for example when the acquired image is either blurred, of insufficient resolution and/or is otherwise of poor fidelity.

A multiresolution structured light pattern according to embodiments of the present invention may also be considered a composite of coarse and fine symbols or sub-symbols, like bits of a byte of digital data. The coarse symbols may be considered relatively higher order bits of a data byte used to estimate a depth of one or more points within a scene whose image has been acquired, while the fine structured light symbols may be considered lower order bits of the same data byte. The more symbols of a structured light pattern according to embodiments of the present invention which are detected, identified and/or decoded, the higher the resolution with which depth may be estimated using that pattern. According to further embodiments, fine symbols of a structured light pattern according to such embodiments may provide enhanced angular resolution in connection with depth estimations. As fine symbols may be spread across and/or within the same area as a coarse symbol, detection and measurement (e.g. sub-pixel location) of a specific fine symbol within the area or borders of a course symbol may provide for refined depth estimations of one or more scene object points or portions within the area or borders of the coarse symbols.

Different image processing techniques may be used for the detection and decoding of coarse symbols than used for the detection of fine symbols. For example, detection of coarse symbols within an acquired image may include low pass filtering or binning of pixels in order to cause the fine symbols to fade from the acquired image. This type of filtering can occur naturally due to poor focus, low resolution imaging and/or environmental conditions. Different image processing techniques may be used for the detection and decoding of fine symbols than used for the detection of coarse symbols. For example, detection of fine symbols within an acquired image may include high pass filtering of the image and/or various other image processing techniques which would cause the coarse symbols to fade and/or the fine symbols to be enhanced within the acquired image. According to some embodiments, detection and/or decoding of coarse symbols may assist in detection and/or decoding of the fine symbols in the same pattern.

According to embodiments, the coarse symbols may be bi-dimensionally of bi-axially encoded or modulated. Likewise, fine symbols may be bi-dimensionally of bi-axially encoded or modulated to carry information. Encoding or modulating information onto coarse and/or fine symbols may be discrete or encapsulated, within the geometry of symbols itself. Additionally encoding or modulating information onto coarse and/or fine symbols may be contextual, at least partially based on orientation and proximity of the symbols relative to other features within the structured light pattern.

According to some embodiments of the present invention, an image processing circuit may analyze an acquired image of a scene using relatively lower resolution pixel processing techniques, for example averaging multiple adjacent pixel values into one pixel value, to detect and decode coarse symbols, which coarse symbol may facilitate the image processing circuitry to estimate relatively lower resolution three dimensional information about the scene area onto which the coarse symbol was projected, for example, using any structured light based depth estimation technique known today or to be devised in the future. If a region of interest within the acquired image of the scene is detected or otherwise identified, the image processing circuitry may utilize relatively higher resolution pixel processing techniques to detect, identify or otherwise decode fine symbols within the region of interest. Accordingly, there may be provided a multistage processing technique to: (a) identify a region of interest within an acquired image using coarse symbols, and then (b) to estimate relatively higher resolution 3D information about the region using fine symbols. According to further embodiments, a controller or control circuit of an imaging device or system according to embodiments of the present invention may cause one or more imaging circuits and/or imaging assemblies to focus on a region of interest detected from a relatively low or lower resolution 3D image of the region, estimated using coarse features detection of projected multiresolution structured light symbols, thereby facilitating detection and decoding of fine features of the structured light symbols.

A visual symbol according to embodiments may be contained within a portion of a structured light pattern projected onto an object of a scene. For purpose of the present application, visually detectable elements of one or more coarse symbols of the projected pattern may be referred to as a low (or relatively lower) resolution pattern and visually detectable elements of one or more fine symbols of the projected pattern may be referred to as a high (or relatively higher) resolution pattern.

According to some embodiments of the present invention, there may be provided a depth sensing system which includes a memory unit capable of storing one or more images of a structured light pattern to be projected onto a scene, and a processor capable of decoding the structured light image, where the processor may be configured to use at least a first set of feature types associated with a relatively lower resolution pattern and at least a second set of feature types associated with a relatively higher resolution pattern in processing the one or more images to extract depth information from the one or more images of the scene.

According to some embodiments of the present invention, there may be provided a method which includes obtaining one or more images of a structured light pattern projected onto a scene, and decoding the one or more images using at least a first set of feature types associated with a lower resolution pattern and at least a second set of feature types associated with a higher resolution pattern in order to extract depth information from the one or more images of the scene.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
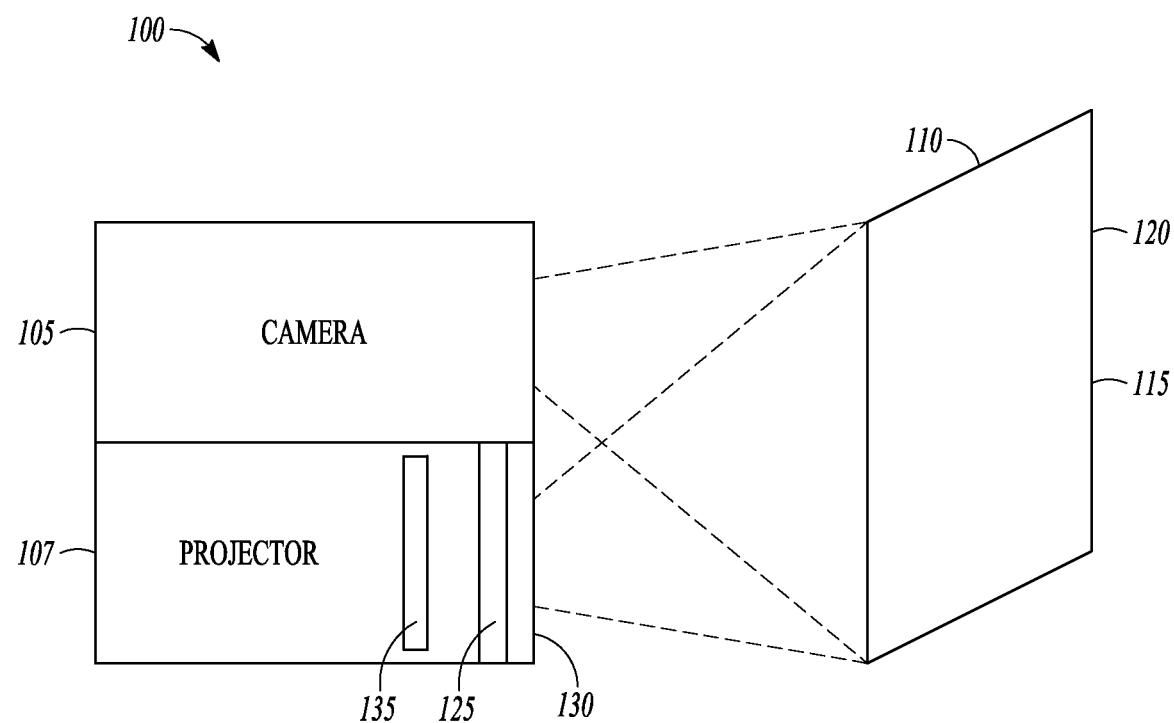
FIG. 1 is a block diagram of a depth sensing system utilizing different coded light pattern resolutions according to an example of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The functions or algorithms described herein may be implemented in software or a combination of software and human implemented procedures in one embodiment. The software may consist of computer executable instructions stored on computer readable media, including tangible and non-transient computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

FIG. 1 to which reference is a block diagram of a depth sensing system utilizing different coded light pattern resolutions according to an example of the presently disclosed subject matter. A depth sensing system is capable of providing depth information in respect of object in a scene. Depth sensing systems are sometimes referred to as 3D imaging systems or 3D capture system. Various other terms are used to describe systems which rely on depth sensing capabilities. All such systems are within the scope of the presently disclosed subject matter, and are collectively referred to herein as depth sensing systems. The depth information can take on many forms including simple measurements in a 2D or 3D space, a range map, a point cloud, 3D models and images, etc.

According to one example, a depth sensing system 100 includes a camera 105 and projector 107, as is shown in FIG. 1. The camera 105 may be an infrared (IR) based camera, corresponding to the projector 107 projecting light that includes light in the IR band. The projector 107 can be an IR projector. According to one example of the presently disclosed subject matter, the system may operate in a low resolution mode and in a high resolution mode. In another example, the system 100 may be configured to use two different structured light codes, a high resolution code and a low resolution code. In one example, the high resolution code and the low resolution code are projected at different times, and are captured at different sampling windows (which are typically synched with the projection of the codes). In another example, the appearance of the high resolution and/or the low resolution code (as captured by the sensor) is a result of the imaging conditions, or of the location or optical properties of objects or surfaces within the scene. In yet another example, the high resolution code and the low resolution code appear within different regions of the sensor's field of view within a single frame. In another example, the system projects a single code and the appearance of the low or high resolution codes is a result of the sampling or decoding configuration that is used with a given frame or with different regions within a given frame.

In one example, both the first and the second structured light codes include a plurality of feature types, each feature type is distinguishable according to a unique bi-dimensional formation that is created by a unique combination of feature elements. The feature elements can be envisioned, for example, as black and white points or areas and each such point or area can correspond to a respective projection point or area of either high or low illumination intensity of monochromatic light on an imaged object. However, it would be noted that some examples of the presently disclosed subject matter are not limited to bi-tonal and bi-dimensional patterns, and that other types of patterns can be used, including uni-dimensional multi-tonal patterns (lines of color). In such an example finer lines of color may blend with one another and the color blending may create a second lower resolution pattern of colored lines. It would be appreciated that the pattern can be embodied in a mask, and the projected pattern is received by illuminating the mask.

The pattern can embody the code, and thus the terms pattern and code are used herein interchangeably.

In one example, the two codes may be entirely independent. In another example, the two codes are related to one another. For example, the lower resolution code can be a derivative of the higher-resolution code. Still further by way of example, the feature types of the first, high-resolution, code can include higher frequency data or finer feature elements relative to the feature types of the second, lower-resolution, code. The second code can be a result of subtracting or fusing the high-frequency elements in the first code, as will be further discussed below.

It would be appreciated that while in the following description reference is made to an example of a structured light 3D sensing system that uses two structured light codes, further examples of the presently disclosed subject matter include 3D sensing systems that use more than two structured light codes, such as three structured light codes, or even four codes, and each code has a different resolution. Thus, references to two codes are made by way of example, and the teachings provided herein can also apply to 3D sensing systems that employ three or more structured light codes.

According to examples of the presently disclosed subject matter, the two structured light codes can be a result of the 3D sensing system projecting the two codes and being capable of decoding each one of the two codes. In this case, the 3D sensing system can include two different masks, one for each structured light code or any other beam shaping elements, including two or more diffractive optical element for respective two or more codes. The system 100 can also include two projectors, or can use a single projector that is capable of switching between the two codes. In one configuration, the system 100 can be capable of projecting and imaging the two codes simultaneously, for example, by using different wavelengths and sensors or filters for imaging each of the two projected codes. In this configuration, the system 100 may require two projectors. In another example, a single projector is used with a mask shifting or alternating mechanism (e.g., MEMS based, or using emitters switching or alternative emitters) to selectively project one of the two codes each time.

In another example, only one code is projected by the 3D sensing system, and the second, lower resolution code, is a result of down sampling of the projected (high-resolution) code. The down sampling can be a result of an operation that is performed in and by the system 100 or the down sampling can occur naturally as a result of the imaging conditions or as a result of the content of the image, as will be further explained below. The relationship between the two codes can be such that the second (low-resolution) code is a result of fusing high-frequency elements in the first code. The appearance of the lower resolution code in the image can be a result of a degradation of the projected higher resolution code. There are several factors which can lead to code degradation including: blurring, modulation and noisy signal.

a. blurring can happen, for example, when the object is out-of-focus, due to transparency of an object, as a result of diffraction, or due to faulty equipment.

b. modulation—certain 3D texture and certain intensity reflectance patterns of objects in the scene can interfere with the projected pattern. In some cases 3D texture or intensity reflectance patterns of objects in the scene "destroys" high frequency data. For example, hair or precipitation can render small feature elements illegible to the decoding process.

c. noise or low signal to noise ratio (SNR) can also render small feature elements illegible to the decoding process. Low SNR is usually characteristic of high gain conditions, which can often be a result of low illumination conditions.

One example of down sampling that is a result of an operation performed in and by the system 100 is when the camera 110 or the processor 130 bin sensor pixels in at least an area of a given frame. Binning the pixels has the effect of down sampling the binned area. In the binned area the lower resolution code can be received, instead of the projected high resolution code. Furthermore, in areas of a frame where the decoder fails to decode the imaged pattern or when the quality of the decoded data is not high enough, the processor 130 can be configured to instruct the decoder to attempt to extract depth information using the lower resolution code. The processor 130 can try to predict in advance which areas of a frame will likely fail to decode and down sample those areas either by binning the respective pixels or otherwise down sampling the data stream provided by the sensor. For example, the processor can determine from a color image areas where the texture is characterized by a frequency which could modulate the high frequency elements in the higher resolution code, and that this modulation is expected to interfere with the decoding of the respective areas in the image, making such decoding difficult, costly, unreliable or impossible. In an alternative example, processor 130 down sampling is used ex post facto, after a certain area of the frame failed to decode or when the quality of the output of the decoding process is not satisfactory. In this configuration, the frame or some area thereof can either be re-taken and the subsequent frame is down sampled either by binning or by down sampling the data stream from the sensor.

As mentioned above, down sampling can also occur naturally as a result of the imaging conditions or as a result of the system 100 configuration.

For example, in case the 3D sensing system has a minimum focus distance, of say 40 cm, the system 100 according to examples of the presently disclosed subject matter can still be capable of extracting depth information for objects located at a shorter distance. At such shorter distances, defocus blurring can cause some finer details to be lost in the image, however, by configuring the decoder such that it is capable of applying a second decoding process that is based on a lower-resolution code, which is in turn based on the lower frequency feature elements of the projected code, and the corresponding feature types, depth information can still be extracted from the blurred areas of the captured image.

In another example, there may be certain noisy areas in the image of the projected pattern, for example, in areas of the images which correspond to objects that are located beyond a certain distance from the system, where the signal to noise ratio (SNR) can be too low (e.g., due to signal decay) for decoding that involves the finer, high resolution, feature elements. However the lower-resolution feature elements may be decodable even in noisy areas of the image and thus it may be possible to extract depth information for such areas. In some cases, this means that the depth sensing range of the system can be extended using the lower resolution mode. It would be appreciated that the level of noise in an image can be associated, for example, with the configuration of the depth sensing system and various components thereof, and the selection of which mode to use in which area can be based on predefined definition, such as an instruction to use the high resolution mode for objects located within a certain range from the system and the lower resolution mode for extended range, or the selection can be made for each image separately based on an analysis of the image.

One case where a depth sensing system that is configured to operate at two different resolution modes (high and low) can be associated with improving the efficiency and/or the range of the depth sensing system, such that high resolution 3D recording and/or reconstruction is applied only to a specific region(s) of interest within a given scene, thus reducing the computational load involved with high resolution 3D capture. In another example, having two different resolution modes in a depth sensing system can allow to extend the system capabilities, coverage and/or range and/or depth of field ("DOF"). In yet another case, having two modes of resolution can improve the coverage and robustness of the 3D capture system, by allowing it to provide better results when a scene includes areas which are difficult to be resolved at the higher resolution mode (e.g., due to 3D texture of the object or the 2D reflectivity pattern), but can be resolved at the lower resolution or vice-versa.

In one embodiment, a two or more layer resolution resolving projected pattern 110 enables the system to work in the corresponding two or more resolutions. A low resolution pattern 115, can be sampled at low resolution by the system hence obtaining rough 3D mapping of the scene. A second, high resolution pattern 120 can also be sampled. In one embodiment, the high resolution pattern capture and processing can be performed within an identified region of interest (ROI) of the whole three dimensional sensing system field of view (FOV), where the ROI is a part of the whole FOV. The depth sensing system can include control circuitry which is implemented either as discrete controllers for both the camera and projector, or as a combined controller.

Figure 2:
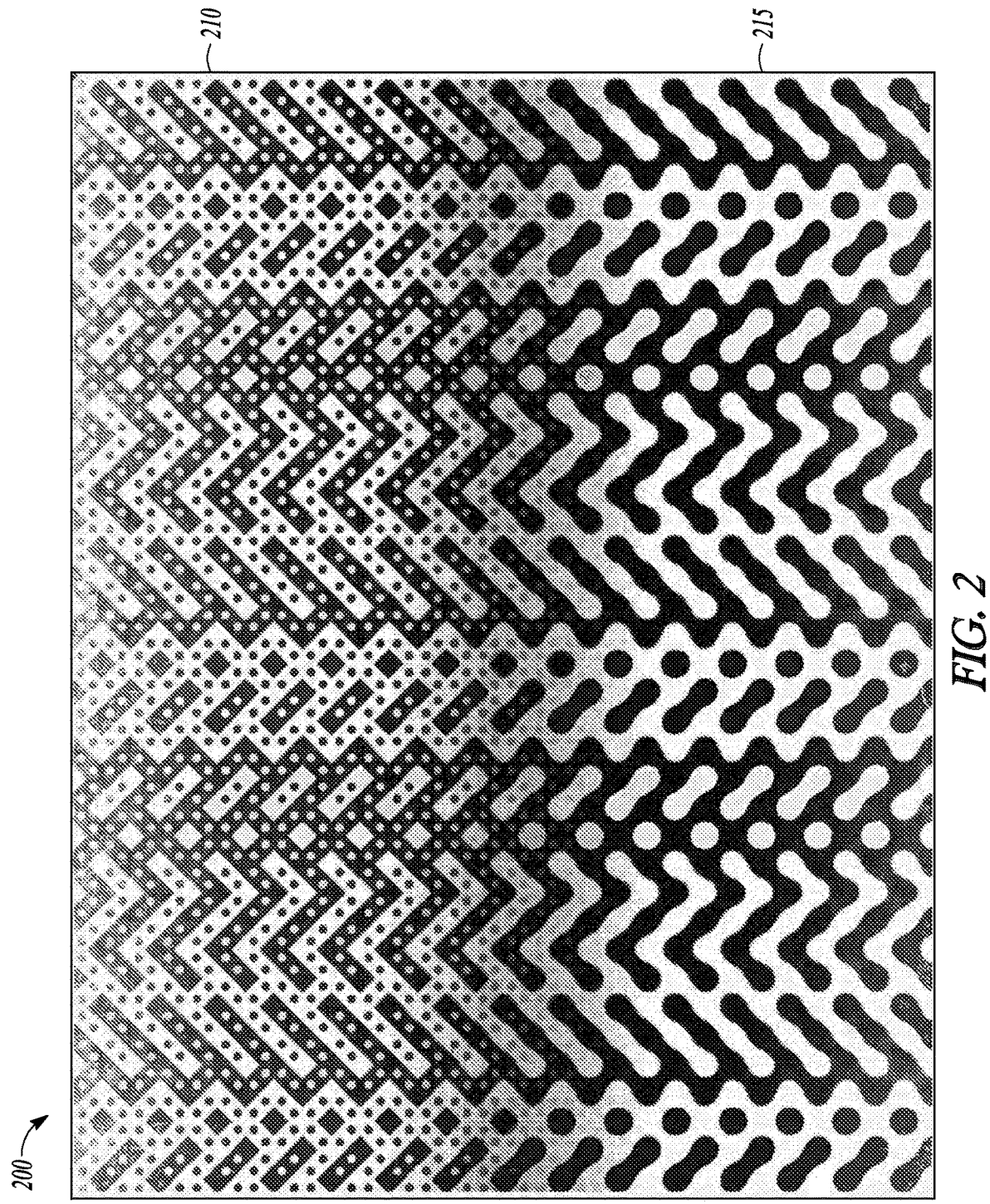
FIG. 2 is a graphical illustration of the appearance of a projected pattern and a transition from an appearance of the original pattern and to a degraded pattern giving rise to a high resolution pattern and a low resolution pattern, according to an example of the presently disclosed subject matter.

FIG. 2 to which reference is now made is a graphical illustration of a the appearance of a projected pattern and a transition from an appearance of the original pattern and to a degraded pattern giving rise to a high resolution pattern and a low resolution pattern, according to an example of the presently disclosed subject matter. FIG. 2 shows a high resolution portion 210 and a low resolution portion 215 which correspond to the projected high and low resolution patterns 120 and 115 respectively in FIG. 1. For illustration purposes a transition effect is used to show the relation between the high resolution portion 210 and the low resolution portion 215. As is shown in FIG. 2, the low resolution pattern 215 is received when the high frequency elements of the high resolution pattern 210 are fused. It would appreciated that the pattern pair shown in FIG. 2 is merely one example of a possible pattern that can be used in examples of the presently disclosed subject matter, and that many other patterns can be created and used in examples of the presently disclosed subject matter, including patterns where one pattern is a result of fusing high frequency elements from the other pattern in the pair and where the effects of the degradation have a similar or a different effect over the high-frequency feature elements.

Optics 130 are associated with the mask 125 and are used to project light from an array 135 of emitters. Different portions of the emitters (e.g., lasers) array 135 may be actuated in pulses to control the light intensity that is used to illuminate the pattern, where stronger illumination is more likely to allow capturing of the high resolution pattern.

Note how in FIG. 2 the top portion of the drawing shows smaller features elements of the pattern compared to the bottom portion of the drawing, and the appearance of the pattern transition from the high resolution image to the lower resolution image, with finer or smaller features elements fading or becoming less visible in a transition zone while the larger more coarse feature elements remain visible or at least reasonably visible. The visibility of the feature elements is determined by the appearance of the feature elements in the image of the projected pattern and by the decodability of the feature elements. Decodability generally refers to the ability of the decoder to correctly identify a certain area in an image of the projected pattern as being associated with a certain feature element. It would be noted that there are various algorithms which can be implemented in a decoder and which can assist the decoder in correctly identifying feature elements in an image, including for example an algorithm which analyzes the surroundings of a given area in an image and determining the feature elements identity based on the analysis of the area around the area where the feature element is identified. It would be noted that given a certain pattern were each feature type is comprised of a unique combination of feature elements, the area around each feature elements can provide hints of help verify the classification of a given area as being associated with a particular feature element.

In one non-limiting embodiment of an example mask, the finer feature elements of the mask have sharp angles, and may be in the form of rectangles. Further fine feature elements include circles of relatively small diameter. Meanwhile the coarser feature elements of the low resolution pattern are generally rectangular with curved long sides and rounded short sides. The low resolution pattern also includes circles, but the circles are quite a bit larger, approximately three times larger in one embodiment, than the smaller circles of the finer feature elements of the high resolution pattern. The rectangular feature elements in both patterns may be similarly sized. In one embodiment, the rectangular feature elements may extend from each other orthogonally to form fine feature elements squares and circles having similar overall dimensions. The feature elements in both patterns may repeat and appear in both negative and positive form, corresponding to being transparent and opaque respectively. This is just one example of many different patterns that may be used in further embodiments.

According to an example of the presently disclosed subject matter, a depth sensing system can be configured to decode appearance of any one of at least two different (and predefined) structured light patterns appearing in an image of a scene. According to a further example of the presently disclosed subject matter, the decoder that is used by depth sensing system can be configured to identify each one of two (or more) different sets of feature types appearing in an image obtained by the system. The two sets of feature types can appear in different images of a scene or in a different region or regions within a single image. The depth sensing system can be configured to extract depth information by identifying projected feature types in an image of the scene, then corresponding the feature types identified in the image and the feature types in the projected pattern, and comparing the locations of respective feature types. The feature type correspondence is then used to derive the depth information using triangulation. Accordingly, a decoder of the depth sensing system can be configured to identify the feature types of any of the two or more patterns which are used by the depth sensing device. In one example, two (or more) different decoders are used, each is configured to decode a respective one of the patterns which are projected and/or which are captured by the depth sensing system. It would be appreciated that in some examples of the presently disclosed subject matter, a finer resolution of depth information can be achieved by corresponding feature elements, as is disclosed in U.S. Pat. Nos. 8,090,194 and 8,538,166, both to Gordon et. al.

In another example, multi-resolution resolution depth sensing is achieved by having a special structured light pattern having a high-resolution version which degrades to form the same pattern itself. This means that an original version of the structured light pattern has finer feature elements which under certain conditions fuse with one another, but the resulting pattern has some or all of the feature types (codewords) in the original pattern, and not other feature types. In other words, the pattern degrades to form a lower resolution version of itself. In such a case a single decoder or a single decoder version may be capable of handling both resolution modes, possibly with some configuration modifications, since both resolution modes are based on the same feature types (coding "alphabet").

According to an example of the presently disclosed subject matter, the depth sensing system can be configured to implement at least two different modes of operation, where each one of the at least two different modes of operation corresponds to a respective one of the at least two different structured light patterns that the imaging device is capable of decoding.

Yet further by way of example, a first structured light pattern of the two different structured light patterns, which the imaging device is capable of decoding, includes a first plurality of feature types, where each feature type of the first structured light pattern is comprised of a first plurality of feature elements. The second structured light pattern of the two different structured light patterns includes a second plurality of feature types. In one example, the second plurality of features types (of the second structured light pattern) are fewer than said first plurality of feature types (of the first structured light pattern). The second plurality of feature types is comprised of a second plurality of features elements. The number of feature elements that are used to form the second plurality of feature types is smaller than the number feature elements that are used to form the first plurality of feature types, and hence the second plurality of feature types are characterized by a lower resolution compared to the first plurality of feature types, and the first pattern enables higher resolution 3D data compared to the second pattern. In still further examples, the feature elements of the first pattern are characterized by higher frequency in the spatial domain relative to the feature element in the second pattern.

According to one example, a projector of the depth sensing system can be configured to project at least two different structured light patterns in each of at least two respective modes of operation. In one example, the imaging device can be capable of switching between a first and a second mode of operation (and between respective patterns) based on a processing of an image captured with one of the patterns (the first pattern can be either the higher or lower resolution pattern). According to one example, the pattern switching can be responsive to processing of an image captured with the first pattern, which indicates that at least a portion of the first pattern that is imaged in the image failed to decode, for example due to presence of a high spatial frequency texture in the scene. It would be noted that decode failure of a certain pattern can be a result of various circumstances, and in some cases a different pattern would not be sensitive, or as sensitive, to the same or similar circumstances and can be successfully decoded.

In another example, the first pattern can be a lower resolution pattern that is used as default, and when it is determined, e.g., from the processing of an image in which the first pattern is projected onto a scene (the first pattern being a default pattern, for example), that an object of interest (e.g. a person) is present in the scene, the depth sensing system can be configured to switch to a second mode of operation, in which a second, higher resolution pattern is used to obtain higher resolution 3D data of the object of interest detected in the scene or of some portion thereof. In a further example, the switching instruction is received from an external component or software module, such as a local or remote application.

As will be further described below, other configurations of the depth sensing system can change in transition from one mode of operation to another. For example, in the high-resolution mode, only a portion (i.e., a region of interest) of the FOV that is imaged or scanned in the low-resolution mode is imaged. This ROI can be the area of the scene where an object of interest was detected from the wide FOV image captured in the low-resolution mode. In a further example, the sensor pixels in the low-resolution mode can be binned, and are not binned in the high-resolution mode, and so, while in the high resolution mode, each one of the pixels associated with the ROI are sampled (to provide high resolution imaging), and in the low resolution mode, the pixels can be binned or decimated (down sampled). It would be appreciated, that down sampling the pixels may provide sufficient sampling rate for the low resolution mode, while reducing processing load, and in case the sensor or imaging unit have built in binning capabilities, additional resource savings can be achieved through binning.

Further by way of example, the imaging device can be capable of switching between a first and a second mode of operation (and between respective patterns) according to a predefined switching plan. For example the predefined switching plan can include a predefined number (say five) of low-resolution pattern scans, followed by a high resolution scan. The scanning protocol can be adapted from time to time based on previous data or based on an expectation.

Figure 3:
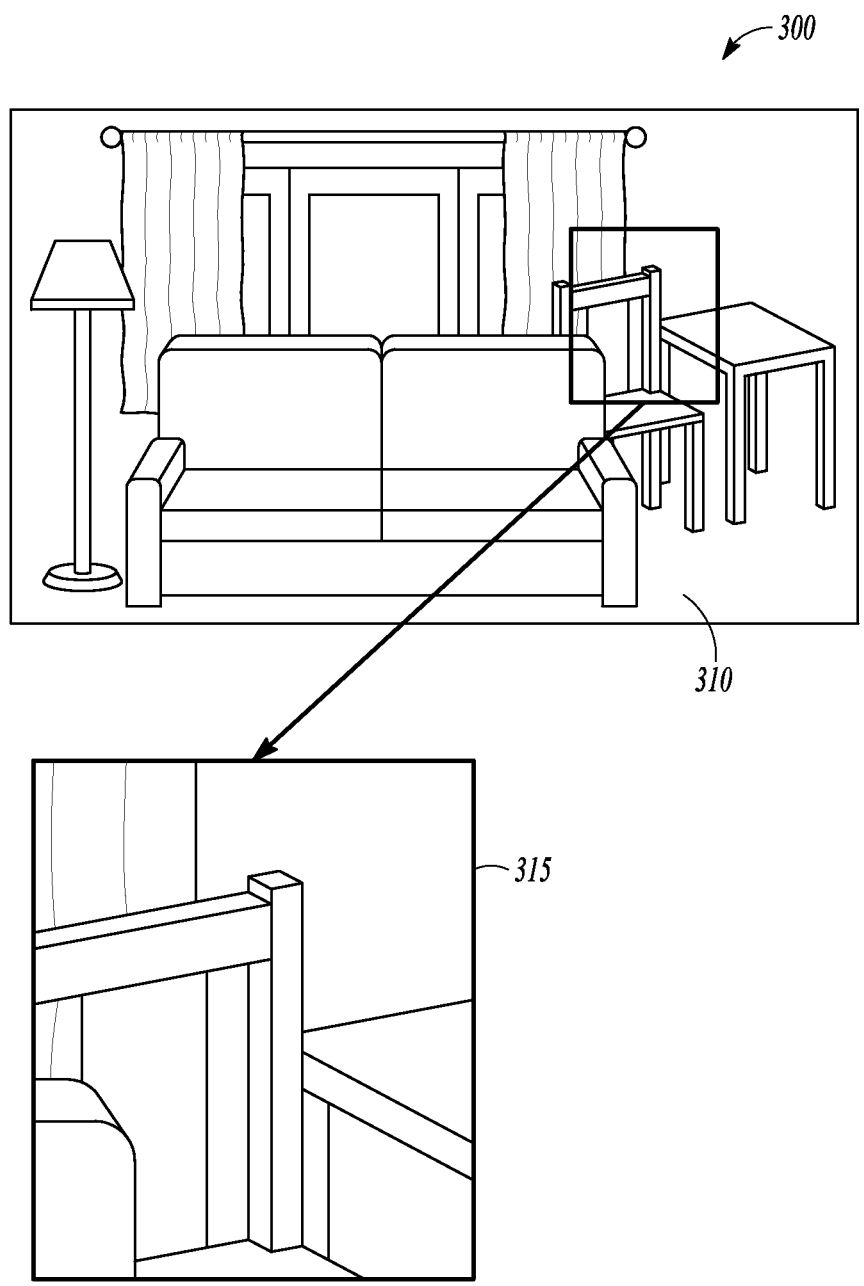
FIG. 3 is an illustration of a scene over which a first low resolution mode is applied to identify a region of interest, and within the identified region of interest a second higher resolution mode is applied, according to an example of the presently disclosed subject matter.

Referring now to FIG. 3 which is an illustration of a scene over which a first low resolution mode is applied to identify a region of interest and within the identified region of interest a second higher resolution mode is applied, according to an example of the presently disclosed subject matter.

Consider a wide field of view (FOV) depth sensing device looking at the scene image of an inside of a room in a house as shown at 300 in FIG. 3. A depth sensing system can be operated in a low resolution mode, to obtain a high level scene 310 depth mapping, for example, to provide a three dimensional geometry or a point cloud representation of a shape of 3D objects in the room. High resolution depth information can be obtained on part of the scene bounded by a rectangle indicated 315 for finer feature sensing.

The projector illuminates the full FOV with a low resolution pattern, or the region of interest (ROI) part identified from the full FOV with the higher resolution pattern. With synchronization with the imaging system 100, the IR camera 105 can be of high resolution. The IR camera also has a field of view that is equal to the full FOV. In alternative modes, the camera with a dual resolution mask, or different cameras with different resolution masks can work in two modes. In one mode, a lower resolution mode such as a full field of view with binned pixels may be used. In a higher resolution or partial view ROI, non-binned pixels may be used.

Using the full FOV with a binned pixel mode enables image transfer from sensor to camera electronics, such as a CPU with a low pixel count. Binning of the sensor pixels can have additional advantages. A cost effective transfer line may be used, allowing low cost, and streamlined processing to identify the ROI.

In some examples, the low resolution pattern can enable efficient scene analysis, while the partial ROI—full resolution can enable partial image transfer to the CPU as well since only part of the FOV is required for high resolution depth sensing. Along with the high resolution pattern, the ROI may have high resolution for fine feature scene analysis. The imaging system can alternate between the two modes of operation where the ROI region can be arbitrary and may be set in accordance with the application needs.

Figure 4:
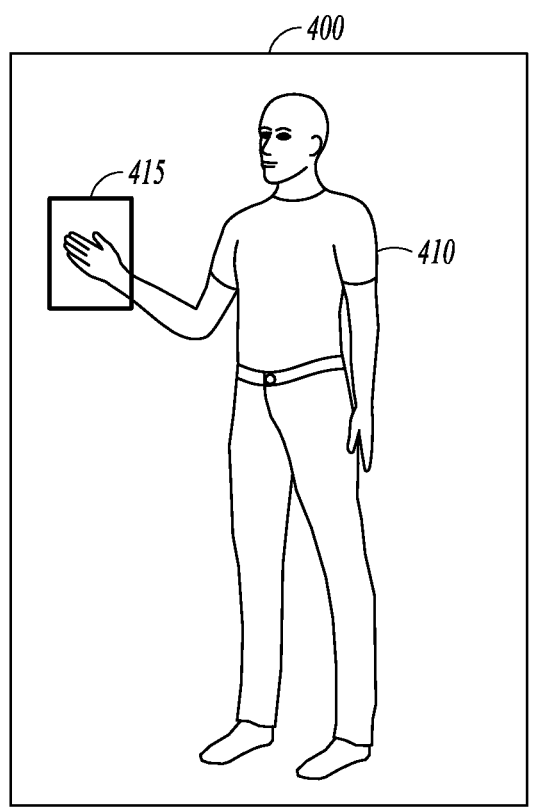
FIG. 4 is an illustration of a scene that includes a human user to be identified using a first low resolution mode and to locate within the scene a region of interest that includes a hand to be imaged at a second higher resolution mode according to an example of the presently disclosed subject matter.

FIG. 4 is an illustration of a scene that includes a human user to be identified using a first low resolution mode and to locate within the scene a region of interest that includes a hand to be imaged at a second higher resolution mode according to an example of the presently disclosed subject matter. Within the full field of view 400 and there appears a person 410. There may be background in the FOV 400, but for this example, the person is imaged separately from the background. The separate imaging of the person may be accomplished by a user of the camera drawing an outline of the person, or based on depth information and image recognition processing that distinguishes the person 410 from the background.

Once the person is identified, the hand of the person may be identified as a region of interest 415. The system may then switch to a high resolution mode to obtain high resolution depth information of the hand and hence gestures being performed with the hand.

For example, the low resolution scene analysis can be used to detect the hand of a user which is a person within the FOV of the system. However the low resolution analysis is not sufficient to detect the fine motion of the hand/gesture in three dimensions. The system can switch to ROI mode to provide the high resolution three dimensional image needed for the analysis.

In another example, a high-resolution analysis can be used by default but when the high-resolution pattern breaks up and cannot be decoded (or the decoding is too difficult or non-reliable), for example when a high frequency pattern is projected onto an object that has rich texture which acts as a low band pass filter, a lower resolution analysis can be used to obtain 3D data (albeit it may be of lower resolution) from the rich texture area.

In another example, the low resolution analysis is performed for regions of the scene which are further away from or are closer to the imaging device and where due to defocus and/or diffusion some of the details of the first, high-resolution pattern, is lost in the captured image but there is enough detail in the image to allow decoding using the second, lower-resolution, pattern.

Figure 5:
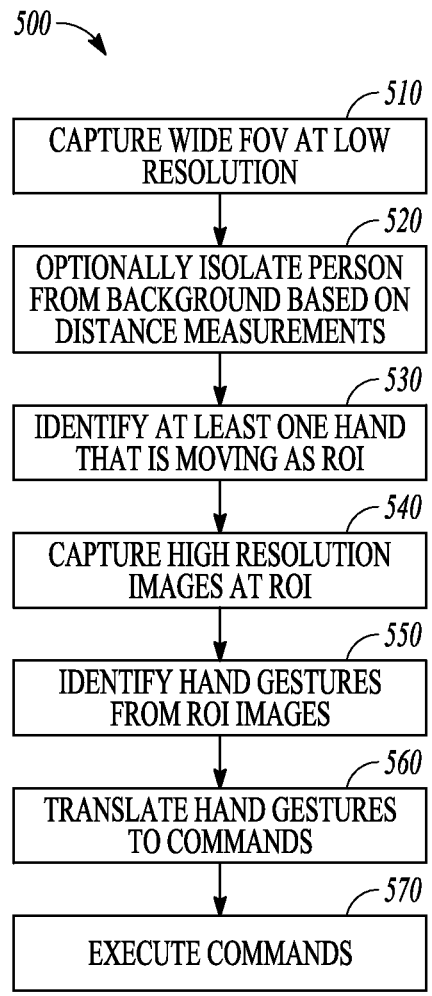
FIG. 5 is a flowchart illustrating a method of identifying gestures to generate corresponding digital system commands using multiple resolution depth sensing according to an example of the presently disclosed subject matter.

FIG. 5 is a flowchart illustrating a method of identifying gestures to generate corresponding digital system commands using multiple resolution depth sensing according to an example of the presently disclosed subject matter. At 510, a scene is captured by the camera with a wide FOV at low resolution. At 520, the person may be optionally isolated from background within the scene. The isolation may be based on user input to identify the person or based on image recognition and depth information to isolate the person. At 530, a hand of the person is identified as a region of interest. The hand may be identified based on knowledge of anatomy as well as pattern recognition in various embodiments. At 540, once the hand is identified as a region of interest, a high resolution mode is entered, and high resolution images of the hand in the region of interest are captured.

At 550, the images of the region of interest may be used to identify the hand gestures. Such hand gestures may include but are not limited to gestures to page or scroll down by moving the hand or fingers in a downward motion, zooming gestures indicated by separating a forefinger and thumb or bringing them together, or scrolling up by moving the fingers in an upward direction relative to the hand. The variety of gestures and their appropriate interpretations may be unlimited. At 560, the hand gestures identified from the images are translated into commands to be used to control a computer system that receives the commands from the system 100 and executes them at 570. The commands may alternatively or additionally be used to control the system 100.

The illumination system or projector 107 can be operated in synchronization with the camera 105 imaging system. The full FOV mode uses the projector 107 to illuminate the entire FOV. Once the system switches to ROI mode the projector 107 may be used to illuminate a part of the scene using the high resolution pattern and fewer emitters, e.g., a subset of all emitters of a VCSEL array, such as those emitters necessary for illuminating the region of interest and possibly a margin area around the region of interest.

A partial illumination method can be obtained by using the VCSEL array split to an array of directly addressable regions or even of directly addressable individual emitters that enable the system to selectively activate a portion of the array to illuminate just the corresponding ROI of the imaging system using the higher resolution mask or some portion thereof. As mentioned above, in some examples of the presently disclosed subject matter, there is only a single mask that is used in the system 100, and this mask provide the high resolution pattern. The lower resolution pattern can be a result of the processing mode that is used by the system 100 (for example binning or down sampling) or may be a result of the signal quality.

According to one example, once the system operates in the ROI mode (switching over from a full FOV mode), energy levels may become low since each single pixel of the camera collects less light than each binned pixel in the full FOV mode. However, since only a portion of the emitters array is used in this mode, the projector operates at partial energy level, and the portion of the array that is used can be operated at a high repetition rate without fear of burn out. An enhanced heat sink may be used to clear excessive heat generated by the high repetition rate.

It would be appreciated that in the following discussion the various depth sensing system 100 configurations and operation parameters are non-limiting.

In one example, the IR camera 105 may include a 9MP sensor with a 3000×3000 pixel array. The camera 105 may be capable of delivering a 3×3 binned image, where every small region of 3×3 pixels is binned to deliver one pixel to the output. Thus the sensor output will be 1 MP binned pixels instead of 9 MP. Image sampling rate can be 10 Hz in the full FOV case and 100 msec per binned frame.

The camera can be capable of switching to an ROI mode where 0.25 MP (500×500) original pixels out of the full 9 MP of the sensor (which can be used in a full FOV mode) are chosen to provide the sensor output. The ROI can be selected according to an analysis of a previous image or of 3D data captured in a previous frame or frames. In another example the ROI is selected according to a predefined coverage or sampling plan which instructs the 3D camera what ROI to image using the ROI mode and when to image it. In another example the ROI is selected based on an instruction received from an external source, such as an application or a remote host, or based on an instruction received from a user. For example a user instructs the depth sensing system to activate the ROI mode and to use this mode to capture high-resolution 3D data (or any other kind 3D data which is made available by using a different pattern) within a selected region. The selection can be made by touching, marking or otherwise selecting a certain point or area on a touch sensitive screen. In further examples, other user interface modules can be used to obtain the user instruction, including tactile units, voice commands, eye tracking technology and any other suitable user input devices. In accordance with the camera sensor the VCSEL based illumination system may be designed to illuminate the entire FOV. But alternatively the system may be designed to have 6×6=36 regions, from which the system can activate any 2×2 elements that best match the desired ROI.

In another example, the ROI dimensions and/or the VCSEL regions can have various dimensions and can be defined and/or selected based on the configuration of the hardware components (the sensor, and the emitters array) and based on some predefined criteria, including one or more of the following: the scene content, the requirements of or selection by an application or a user, resource availability in the system, etc.

Once in ROI mode, the repetition rate can be 4 times the full FOV rate that is 40 Hz (25 ms per pulse). Also, the lasers can be over-derived for more optical power, obtaining 1M ROI pixels at 4×0.25M=1M.

In one embodiment, the system may operate in alternating modes, providing both low resolution and high resolution at the same time. During the ROI mode, the processor can accumulate the four fast sequence images thus obtaining more energy accumulated.

Figure 6:
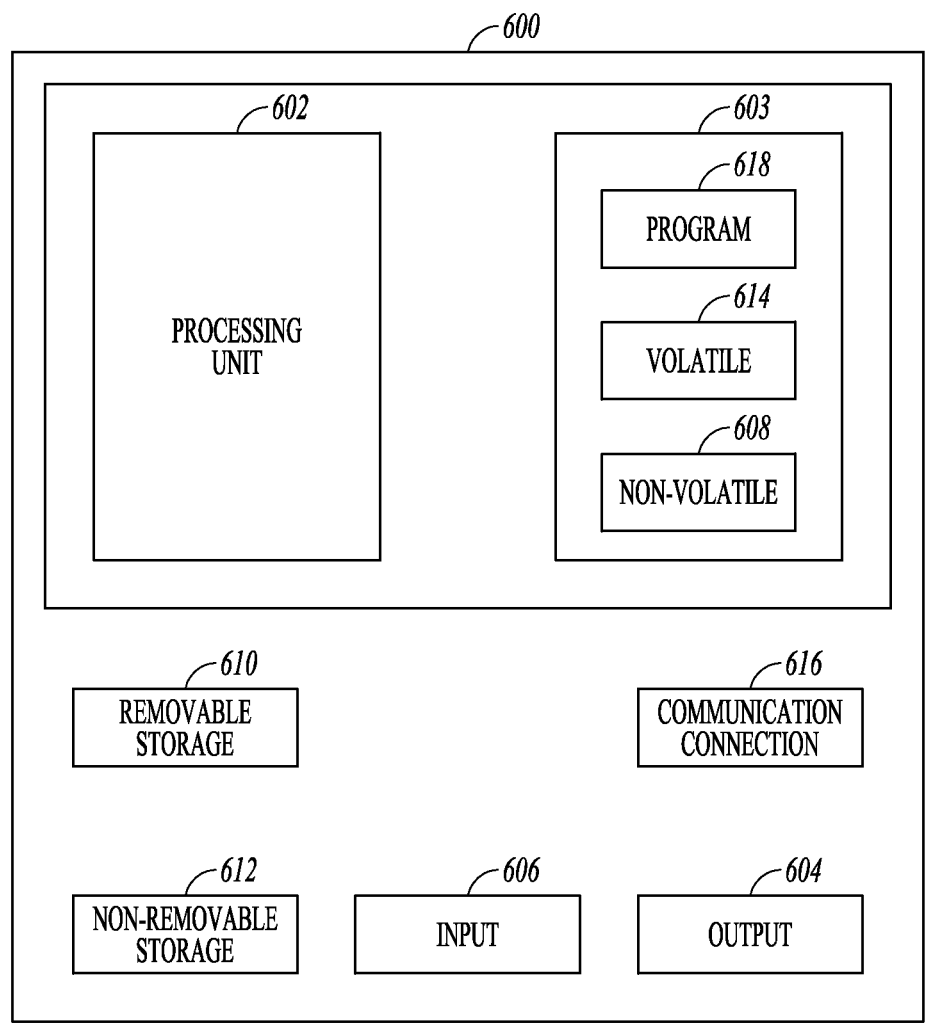
FIG. 6 is a block schematic diagram of a computer system 600 to implement electronic circuitry to perform one or more methods and functions according to an example embodiment.

FIG. 6 is a block schematic diagram of a computer system 600 to implement electronic circuitry to perform one or more methods and functions according to an example embodiment. Fewer components than shown may be used in various embodiments. One example computing device in the form of a computer 600, may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

Figure 7:
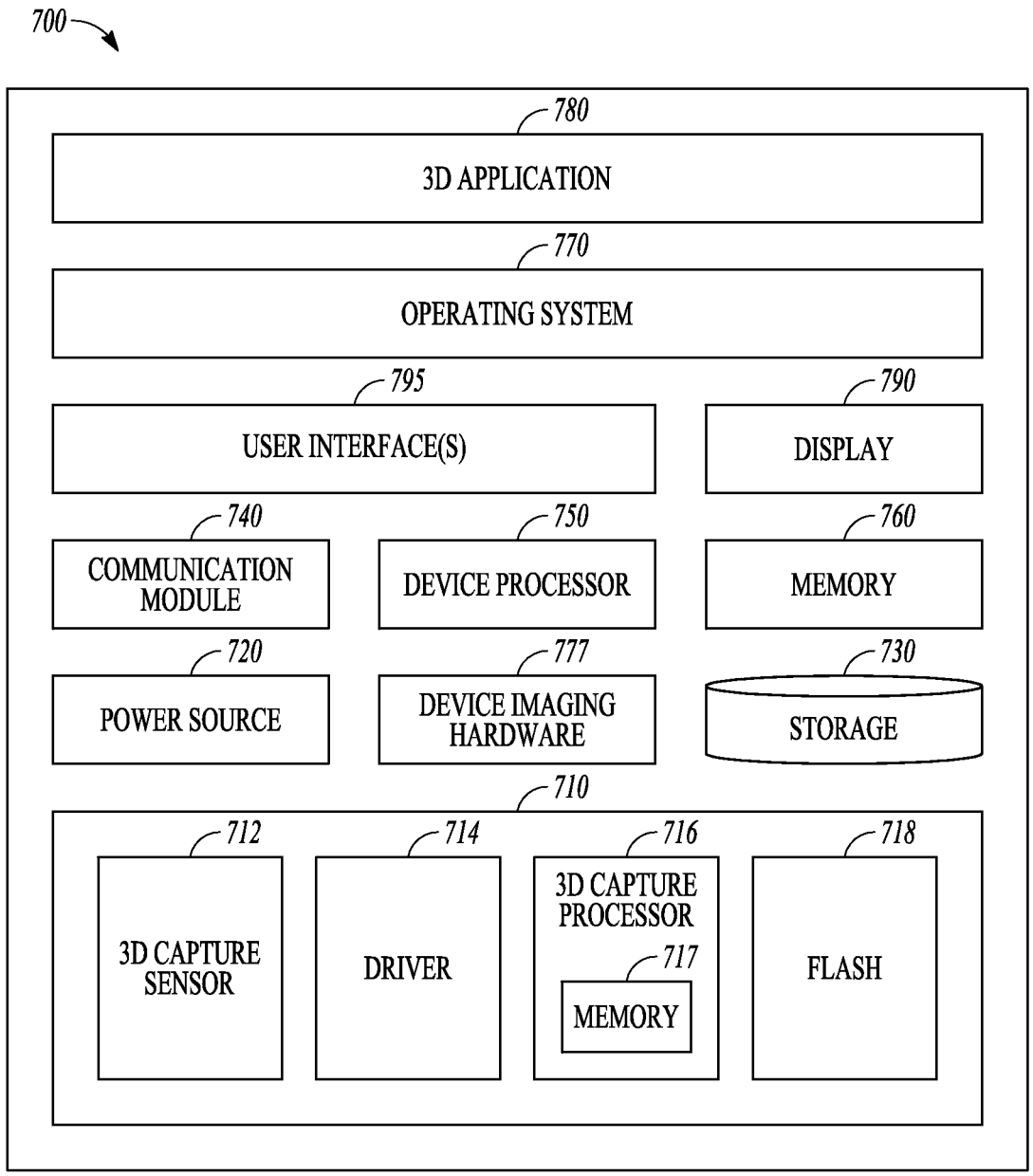
FIG. 7 is a block diagram of a mobile communication device for using structured light patterns with high and low resolution features for extracting three dimensional information from a scene according to example embodiments.

FIG. 7 is a block diagram of a mobile communication device 700 for using structured light patterns with high and low resolution features for extracting three dimensional information from a scene according to example embodiments. In some embodiments, mobile communication device 700 can include a 3D camera 710 that is capable of providing 3D depth or range data. FIG. 1 illustrates a configuration of an active stereo 3D camera, but in other embodiments of the presently disclosed subject matter, other 3D cameras 710 can be used. Those versed in the art can readily apply the teachings provided in the examples of the presently disclosed subject matter to other 3D camera 710 configurations and to other 3D capture technologies.

In some embodiments, the 3D camera 710 can include a 3D capture sensor 712, a driver 714, a 3D capture processor 716 and a flash module 718. In some embodiments, the flash module 18 is configured to project a structured light pattern and the 3D capture sensor 712 is configured to capture an image that corresponds to the reflected pattern, as reflected from the environment, onto which the structured light pattern was projected. International Application Publication No. WO2013/144952 also describes an example of a flash design.

In some embodiments, the flash module 718 may include an infrared ("IR") light source that it is capable of projecting IR radiation or light, and the 3D capture sensor 712 may be an IR sensor that is sensitive to radiation in the IR band, such that the 3D capture sensor 712 is capable of capturing the IR radiation that is reflected from the objects in the scene. The flash module 718 and the 3D capture sensor 712 may be calibrated. In some embodiments, the driver 714, the 3D capture processor 716, or any other suitable component of the mobile communication device 700 may be configured to implement auto-calibration for maintaining the calibration between the flash module 718 and the 3D capture sensor 712.

The 3D capture processor 716 may be configured to perform various processing functions, and to run computer program code that is related to the operation of one or more components of the 3D camera 710. The 3D capture processor 716 may include memory 717, which is capable of storing computer program instructions that can be executed by the 3D capture processor 716.

The driver 714 may be configured to implement a computer program, which operates or controls certain functions, features, or operations, which the components of the 3D camera 710 are capable of performing.

In some embodiments, the mobile communication device 700 may also include hardware components in addition to the 3D camera 710, including, for example, a power source 720, storage 730, a communication module 740, a device processor 750, memory 760, device imaging hardware 777, display unit 790, and other user interfaces 795. In some embodiments, one or more components of the mobile communication device 700 may be implemented as distributed components. In such examples, a component may include two or more units distributed across two or more interconnected nodes. Furthermore, a computer program, possibly executed by the device processor 750, may be capable of controlling the distributed components and may be capable of operating the resources on each of the two or more interconnected nodes.

Various types of power sources may be used in mobile communication device 700. The power source 720 may include one or more power source units, such as a battery, a short-term high current source (such as a capacitor), a trickle-charger, etc.

The device processor 750 may include one or more processing modules that are capable of processing software programs. Each processing module may have one or more processors. The device processor 750 may be of various different types, such as a main processor, an application processor, etc. The device processor 750, or any of the processors, which are generally referred to herein as being included in the device processor 750, may have one or more cores, internal memory, or a cache unit.

The storage unit 730 may be configured to store computer program code for the operations or functions of the mobile communication device 700 and any of its components. The storage unit 730 may also be configured to store one or more applications, including 3D application 780, which may be executed on the mobile communication device 700. In a distributed configuration, one or more 3D applications 780 may be stored on a remote computing device, and may be utilized by the mobile communication device 700 as a service. In addition, or as an alternative to application program code, the storage unit 730 may be configured to store data, including for example 3D data that is provided by the 3D camera 710.

The communication module 740 may be configured to enable data communication to and from mobile communication device 700. Examples of communication protocols that may be supported by the communication module 740 include, but are not limited to, cellular communication (3G, 4G, etc.), wired communication protocols (such as Local Area Networking (LAN)), and wireless communication protocols, such as Wi-Fi, wireless personal area networking (PAN) such as Bluetooth, etc.

In some embodiments, some of the components of the 3D camera 710 may be implemented on the mobile communication hardware resources. For example, instead of having a dedicated 3D capture processor 716, the device processor 750 may be used. In some embodiments, the mobile communication device 700 may include a plurality of processors or a plurality of types of processor, e.g., one or more digital signal processors (DSP), one or more graphical processing units (GPU), etc., and the 3D camera 710 may be configured to use a specific (or a specific set or type of) processor(s) from the plurality of mobile communication device 700 processors.

The mobile communication device 700 may be configured to execute an operating system 770. Examples of mobile device operating systems include, but are not limited to, Windows Mobile™ by Microsoft Corporation of Redmond, Wash., iOS by Apple Inc. of Cupertino, Calif., and the Android operating system by Google Inc. of Mountain View, Calif.

The 3D application 780 may be any application that uses 3D data. Examples of 3D applications 780 include a virtual tape measure, 3D video, 3D snapshot, 3D modeling, etc. Different 3D applications 780 may have different requirements and features. A 3D application 780 may be assigned to or may be associated with a 3D application group. In some embodiments, the mobile communication device 700 may be capable of executing a plurality of 3D applications 780, in parallel or simultaneously.

Device imaging hardware 777 can include any imaging sensor; in some embodiments, an imaging sensor that is capable of capturing human-visible light images may be used. In some embodiments, the device imaging hardware 777 may include a sensor, typically a sensor that is sensitive to at least human-visible light, and possibly also a light source (such as one or more light-emitting diodes ("LEDs")) for enabling image capture in low human-visible light conditions. In some embodiments, the device imaging hardware 777 or some components thereof may be calibrated with the 3D camera 710, with the 3D capture sensor 712, or with the flash 718. Such a calibration may enable texturing of the 3D image and various other co-processing.

In some embodiments, the device imaging hardware 777 may include a RGB-IR sensor that may be used for capturing human-visible light images and for capturing IR images. In some embodiments, the RGB-IR sensor may serve as both a 3D capture sensor 712 and as a human-visible light camera. In such embodiments, the driver 714 and the flash 718 of the 3D camera 710, and possibly other components of the mobile communication device 700, may be configured to cooperate with the device imaging hardware 777, and in the example given above, with the RGB-IR sensor, to provide 3D depth or range data.

The display unit 790 may be configured to provide images and graphical data, including a visual rendering of 3D data captured by the 3D camera 710, possibly after being processed using one or more 3D applications 780. The user interfaces 795 may include various components that may enable the user to interact with the mobile communication device 700, such as speakers, buttons, microphones, etc. The display unit 790 may be a touch sensitive display, which may also serve as a user interface.

The 3D capture processor 716, the device processor 750, or any sub-components or CPU cores, etc. of such processing entities may be configured to process a signal that is received from the 3D capture sensor 712 or from the device imaging hardware 777, in case the device imaging hardware 777 is capable of and is configured to serve the 3D camera 710. For convenience, the core 3D capture functions shall be attributed, in a non-limiting manner, to the 3D capture sensor 712 and to the 3D capture processor 716. However, it would be appreciated that the functionality and task allocation between the various components and sub-components of the mobile communication device 700 are often a design choice.

In some embodiments, the 3D capture processor 716 may be configured to collect imaging data, process the imaging data, analyze the imaging data, produce imaging results, produce imaging content, and/or produce imaging display, etc.

In some embodiments, the 3D capture processor 716 may receive IR image and calibration information as input. In some embodiments, the calibration information may relate to an IR sensor (as an example of a 3D capture sensor 712) and projector (such as the flash 718 component). In some embodiments, 3D capture processor 716 can also receive as input a color image, e.g., from device imaging hardware 777, and color camera—IR camera calibration information.

In some embodiments, the processing performed by 3D capture processor 716 may include pre-processing, optical character recognition (OCR), error correction, triangulation, etc. Pre-processing may include operations for removing sensor noise or for improving signal quality, e.g., by resolving optical issues, such as speckles. OCR functionality may translate areas in the image to one of a plurality of code words that were used in the pattern projected by the flash 718 and captured by the 3D capture sensor 712.

In various embodiments, code words are the coding counterparts of feature elements. Each code word is assigned with a value. In the decoding process, feature elements are identified in the captured image, translated to respective code words and assigned with a respective value. In a bi-dimensional code, each feature element consists of a plurality of code elements and each feature element is characterized by a unique formation of the feature elements.

Error correction functionality may include computations, which may use pre-existing knowledge on the projected pattern/code to correct erroneous labeling of code words or elements of code words (which may lead to changing of a label of one or more code words). In this context, a code word is the concept, and the label is the actual classification of the code word. For example, if any of the letters A-F is a code word, then C is the label of a certain identified code word. Triangulation functionality may take into account imaging geometry to extract relevant depth information. An example of a triangulation procedure that is made with reference to active triangulation methods is provided in U.S. Pat. No. 8,090,194 to Gordon et al.

In some embodiments, 3D capture processor 716 may also perform a color projection function, whereby a color from a color sensor (e.g., from the device imaging hardware 777) is projected onto 3D data. The color projection function (as with any other function described here with reference to the 3D capture processor 716) may be performed by the device processor 750, or any processing component thereof.

Additional processes that may involve processing operations and that may be implemented as part of a 3D data processing pipeline for certain 3D applications 780 may include one or more of the following: live system control (e.g., auto gain, auto exposure, control of active source power and pulse duration, etc.), point cloud registration, denoising, feature classification, feature tracking, 3D vision, passive camera processing (e.g., pose estimations, shape from motion, etc.), inertial measurement unit (IMU) processing (e.g., Kalman filters), time stamping, image signal processing ("ISP") functions (demosaic, gamma correction), compression, calibration quality monitoring, etc. The above operations may be executed by the 3D capture processor 16, the device processor 750, or both; the processing tasks can be divided among the various processing resources, in advance or in real-time.

In some embodiments, 3D camera 710, after processing the signal from 3D capture sensor 712 and possibly from other sources, may be configured to provide as output one or more of the following: a set of 3D points, typically with "normals" (e.g., point clouds), where the normals can be computed using adjacent points; a textured mesh—triangulation (generating polygonal surface) using adjacent points; or a depth map with a color map (color projection). Additional outputs may be provided by 3D camera 710. In some embodiments, some of the processing attributed to 3D camera 710 and to 3D capture processor 716 may be performed external to 3D camera 710, and in particular by device processor 750; thus, some of the outputs attributed to 3D camera 710 may be generated external to what is referred to as 3D camera 710 in the examples shown in FIG. 7 and in the description of FIG. 7 provided herein.

The term "3D application" as used herein relates to computer program code that may be executed as an application on a mobile communication platform (whether hosted locally or hosted remotely and consumed as a service on a mobile communication device 700), and which computer program code embodies at least one feature that uses 3D data, in particular 3D data that is provided by or obtained from a 3D camera 10. Such a feature is referred to as a "3D capture feature". Many examples of 3D applications 780 exist, for example virtual tape measures, room modeling, 3D segmentation and model creation, augmented reality games, etc.

A 3D application 780, or a 3D capture feature of a 3D application 780, may have certain attributes, characteristics, or requirements. To enable, support, and/or execute different 3D capture features, different hardware and/or software resource allocation requirements may exist (including different levels of a given resource). Furthermore, different 3D capture features may consume different resources (including different levels of a given resource).

For example, assume a 3D conferencing application with a full-scene feature and a face-only feature, where the full-scene feature involves capturing and processing 3D data from the entire field of view of the 3D capture sensor 712, and the face-only feature involves utilizing only the resources that are required for obtaining 3D data of an area in the scene where the face of a person facing the 3D capture sensor 712 is detected. Between the two features, it is highly probable that the full-scene feature of the 3D capture application will consume greater processing, memory, and power resources compared to the face-only feature.

In some embodiments, each 3D application 780 may have at least one mode of operation. In some embodiments, a 3D application 780 may include a live-mode. The term "live-mode of a 3D application" (or "live-mode" in short) relates to a mode of a 3D application 780 in which instant (real-time or near real-time, e.g., up to 1 second of latency) feedback is provided (e.g., presented on a display) to a user (e.g., a human or program) of the 3D application 780. In some embodiments, the feedback provided in the live mode of the 3D application 780, possibly together with additional features of the live mode, may facilitate a certain measure of control over an ongoing capturing process of 3D data. For example, instant feedback that is provided by the mobile communication device 700 in the live mode of a 3D application 780 may enable modification of one or more configurations and/or features or usage of at least one resource of the mobile communication device 700 to modify the results of an ongoing 3D capture process. Examples of modification that may be enabled by the live mode include changing an orientation of 3D imaging components, modifying a level of illumination provided by a projector, changing a type of pattern that is used by a projector, and control over software resources of the mobile communication device 700, such as modifying a level of gain applied to the incoming signal from a sensor, changing a type of error correction used in a decoding process, etc.

The term "non-live mode of a 3D application" or "non-live mode" (e.g., latency is above 1 second), relates to a mode of operation of a 3D application 780, other than a live mode. In some embodiments, a non-live mode of a 3D application 780 is a mode that does not take place concurrently with the 3D capture operation. In some embodiments, a non-live mode of a 3D application 780 may involve further utilization of resources, including, for example, further processing of 3D data. In some embodiments, a non-live mode may include further processing by device processor 750 of the mobile communication device 700 or further processing by external (and/or remote) resources.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A depth sensing system, comprising:
a projector configured to project a bi-dimensional structured light pattern onto a scene, wherein the bi-dimensional structured light pattern is comprised of a plurality of fine feature types, each one of the plurality of fine feature types is formed by a unique combination of a plurality of fine feature elements;
a digital memory device storing data with respect to the plurality of fine feature types, and further storing data with respect to a plurality of coarse feature types, wherein each coarse feature type from the plurality of coarse feature types is comprised of a unique combination of a plurality of coarse feature elements, wherein an appearance of a coarse feature element corresponds to a fusing of two or more fine feature elements;
a sensor configured to capture an image of a reflected portion of the projected bi-dimensional structured light pattern; and
at least one processor coupled to the sensor and to the digital memory device, the at least one processor being configured to:
decode the image of the reflected portion of the projected bi-dimensional structured light pattern to thereby assign depth values to points in the scene;
detect in a region of interest of the image a fine feature type from the plurality of fine feature types; and
detect in the image a coarse feature type from the plurality of coarse feature types.

2. The system according to claim 1, wherein the plurality of coarse feature elements do not exist in the projected bi-dimensional structured light pattern.

3. The system according to claim 1, wherein the plurality of coarse feature elements in the image result from projection or imaging conditions which cause respective fine feature elements to appear fused with one another in the image.

4. The system according to claim 3, wherein the projection or imaging conditions include one or more of the following: object translucency, defocus blurring, and three-dimensional texture.

5. The system according to claim 1, wherein the at least one processor is configured to downsample an area of the image and use coarse feature types for estimating depth values within an area of the scene which corresponds to the downsampled area of the image.

6. The system according to claim 5, wherein the at least one processor is configured to bin sensor pixels.

7. The system according to claim 5, wherein the at least one processor is configured to downsample an area of the image when the area of the image is characterized by a low signal to noise ratio or when the area of the image is characterized by high intensity reflectance patterns of objects in a respective area of the scene.

8. The system according to claim 1, wherein the at least one processor is configured to use a coarse feature type from the plurality of coarse types to obtain a coarse depth estimation, and the at least one processor is configured to compute a fine depth estimation using the coarse depth estimation and a location of a fine feature type from the plurality of fine feature types in the image.

9. The system according to claim 1, wherein the at least one processor is configured to use the coarse feature type to identify the region of interest in the image, and the at least one processor is configured to use a fine feature type within the region of interest to obtain a depth estimation for a corresponding point within the scene.

10. A computer-implemented computer implemented depth sensing method, comprising:
projecting a bi-dimensional structured light pattern onto a scene, wherein the bidimensional structured light pattern comprises a plurality of fine feature types, each one of the plurality of fine feature types is formed by a unique combination of a plurality of fine feature elements;
using a digital memory device for storing data with respect to the plurality of fine feature types, and further storing data with respect to a plurality of coarse feature types, wherein each coarse feature type from the plurality of coarse feature types is comprised of a unique combination of a plurality of coarse feature elements, wherein an appearance of a coarse feature element corresponds to a fusing of two or more fine feature elements;
capturing an image of a reflected portion of the projected bi-dimensional structured light pattern; and
using at least one processor coupled to the digital memory device for:
decoding the image of the reflected portion of the projected bi-dimensional structured light pattern and thereby assigning depth values to points in the scene;
detecting in a region of interest of the image a fine feature type from the plurality of fine feature types; and
detecting a coarse feature type from the plurality of coarse feature types.

11. The method according to claim 10, wherein the plurality of coarse feature elements do not exist in the projected bi-dimensional structured light pattern.

12. The method according to claim 10, wherein the plurality of coarse feature elements in the image result from projection or imaging conditions which cause respective fine feature elements to appear fused with one another in the image.

13. The method according to claim 12, wherein the projection or imaging conditions include at least one or more of: object translucency, defocus blurring, or three-dimensional texture.

14. The method according to claim 10, further comprising using the at least one processor for downsampling an area of the image, and estimating depth values within an area of the scene which corresponds to the downsampled area of the image using coarse feature types.

15. The method according to claim 14, wherein the downsampling comprises binning sensor pixels.

16. The method according to claim 14, wherein downsampling comprises downsampling the area of the image when the area of the image is characterized by a low signal to noise ratio or when the area of the image is characterized by high intensity reflectance patterns of objects in the respective area of the scene.

17. The method according to claim 10, wherein decoding comprises:
  using a coarse feature type from the plurality of coarse types to obtain a coarse depth estimation; and
  computing a fine depth estimation using the coarse depth estimation and a location of a fine feature type from the plurality of fine feature types in the image.

18. The method according to claim 10, wherein using the at least one processor comprises using a coarse feature type to identify a region of interest in the image, and using a fine feature type within the region of interest to obtain a depth estimation for a corresponding point within the scene.

* * * * *